US012680618B2

(12) United States Patent
Vanzetto

(10) Patent No.: US 12,680,618 B2
(45) Date of Patent: Jul. 14, 2026

(54) PISTON-DIAPHRAGM ASSEMBLY FOR A VALVE AND A MANUFACTURING METHOD

(71) Applicant: Exel Industries, Epernay (FR)

(72) Inventor: Denis Vanzetto, Epernay (FR)

(73) Assignee: Exel Industries, Epernay (FR)

( * ) Notice: Subject to any disclaimer, the term of this patent is extended or adjusted under 35 U.S.C. 154(b) by 83 days.

(21) Appl. No.: 18/792,302

(22) Filed: Aug. 1, 2024

(65) Prior Publication Data

US 2025/0043878 A1     Feb. 6, 2025

(30) Foreign Application Priority Data

Aug. 3, 2023    (FR) ....................................... 2308436

(51) Int. Cl.
F16K 15/06          (2006.01)
F16K 41/10          (2006.01)

(52) U.S. Cl.
CPC ............ F16K 15/063 (2013.01); F16K 41/10 (2013.01)

(58) Field of Classification Search
CPC ............ F16K 41/10; F16K 1/38; B05B 1/306
See application file for complete search history.

(56) References Cited

U.S. PATENT DOCUMENTS 6,123,320 A     9/2000   Rasanow et al.
6,508,266 B2    1/2003   Iritani et al.

7,063,304 B2    6/2006   Leys
7,628,376 B2    12/2009  Masamura et al.
2002/0100503 A1  8/2002  Browne et al.
2010/0096578 A1  4/2010  Franz et al.
2016/0327183 A1  11/2016 Binder
2017/0074417 A1  3/2017  Okawara
2023/0010390 A1  1/2023  Wang et al.

FOREIGN PATENT DOCUMENTS

DE          1034938 B      7/1958
DE      102018128187 A1    5/2020
FR         3108378 A1      9/2021
GB          652296 A       4/1951
WO       2014016881 A1     1/2014
WO       2016035412 A1     3/2016

*Primary Examiner* — Daphne M Barry

(74) *Attorney, Agent, or Firm* — Thompson Coburn LLP; Steven M. Ritchey

(57)          ABSTRACT

A piston-diaphragm assembly for a valve with a piston comprising a stem and a needle. The stem comprises a piston groove with a groove proximal rim. The needle is attached to a stem distal end. The assembly comprises a diaphragm with a peripheral annular ring, an internal annular ring received in the piston groove for attaching the diaphragm thereto, and an annular membrane connecting the annular rings. The needle comprises a crown, which surrounds the stem and externally covers the internal annular ring and which comprises a crown rim, which ends the crown at the groove proximal rim. The diaphragm is radially interposed between the groove proximal rim and the crown rim, being in contact with the crown rim.

12 Claims, 5 Drawing Sheets

PISTON-DIAPHRAGM ASSEMBLY FOR A VALVE AND A MANUFACTURING METHOD

CROSS-REFERENCE TO RELATED APPLICATION

This application claims the benefit of FR 2308436 filed on Aug. 3, 2023, which is incorporated herein by reference in its entirety.

BACKGROUND

The present invention relates to a piston-diaphragm assembly, a valve including such an assembly and a method of manufacturing such an assembly.

FR3108378A1 describes a sprayer for spraying a coating product, which comprises a base, with an internal channel, wherein open out an inlet conduit and an outlet conduit for a coating product. A seat is formed in the internal channel at the opening out of the outlet channel. A valve is mounted in the internal channel so as to close same with regard to the outside, so that a coating product chamber is delimited by the valve and the internal channel, into which the inlet conduit and the outlet conduit open. The valve comprises a valve body, by means of which the valve is attached to the base, a stem movable in translation in the valve body and a needle attached to the end of the stem. Depending on the position of the stem, the needle can bear on the seat to close the outlet channel and be distant from the seat so as not to close the outlet channel. To prevent the coating material in the coating material chamber from rising up through the valve body along the stem, the valve has a membrane, sometimes called a diaphragm, surrounding the stem, secured to the valve body by an o-ring and to the stem by another o-ring, an elastically deformable web being deployed between the rings.

If such type of valve is generally satisfactory for handling coating products or other pressurized fluids, a common failure consists of a leak of pressurized fluid at the ring attaching the diaphragm to the stem, under the effect of a progressive accumulation of fluid residues between the diaphragm and the needle, tending to deform or to damage the ring. Indeed, by elastic deformation of the diaphragm during the use of the valve, a gap may accidentally be opened between the diaphragm and the needle. The open gap then allows debris to penetrate between the diaphragm and the needle, the debris keeping the gap open, allowing more debris to accumulate at said location, until the ring is sufficiently deformed or damaged to create a leak of pressurized fluid.

SUMMARY

The goal of the invention is then to propose a novel piston-diaphragm assembly for which the risk of leakage at internal annular ring of the diaphragm is reduced.

To this end, the subject matter of the invention is a piston-diaphragm assembly, for a valve. The assembly comprises a piston, comprising a stem, extending parallel to a distal direction, the stem being intended to be received in a central conduit of a body of the valve, in a sliding fashion relative to the body parallel to the distal direction, the stem comprising a piston groove, surrounding the stem and being radially outwardly open, the piston groove comprising a groove proximal rim and a groove distal rim between which the piston groove is delimited, the groove distal rim being offset along the distal direction with respect to the groove proximal rim. The piston includes a needle, which is fastened to a stem distal end, belonging to the stem, and which is configured to bear against a shut-off seat along the distal direction to shut off a pressurized fluid conduit. The assembly comprises a diaphragm, comprising a peripheral annular ring, for attaching the diaphragm to the valve body, the peripheral annular ring surrounding the piston, an internal annular ring, which surrounds the piston and is received in the piston groove to thereby attach the diaphragm to the piston, and an annular membrane, which connects the peripheral annular ring to the internal annular ring.

The needle comprises a crown, which surrounds the stem by externally covering the internal annular ring and which comprises a crown rim, which ends the crown in a direction opposite to the distal direction, the crown rim being arranged at the groove proximal rim, the diaphragm being radially interposed between the groove proximal rim and the crown rim, being in contact with the crown rim.

One idea behind the invention is to provide that the ring of the needle covers the internal annular ring to a large extent, to prevent a gap between the diaphragm and the ring, more particularly regardless of the elastic deformation imparted to the diaphragm by a fluid under pressure during the use of the valve. The crown of the needle covers the internal annular ring to a large extent in that the crown rim is arranged at the height of the groove proximal rim. The needle advantageously covers the internal annular ring over its entire height, or even also covers a portion of the annular membrane, unlike the prior art which does not provide a covering, or only provides a marginal covering, of the internal annular ring by the needle.

According to other advantageous aspects of the invention, the invention implements one or a plurality of the following features, taken individually or according to all technically possible combinations.

Preferably, the crown comprises a base, which is adjacent to the groove distal rim.

Preferably, the crown comprises an internal conical surface, which connects the base to the crown rim, which converges along the distal direction, the crown bearing obliquely in the direction opposite to the distal direction against the diaphragm via the internal conical surface.

Preferably, the crown comprises an internal concave curved surface, which connects the base to the crown rim, which converges along the distal direction, the crown bearing obliquely in the direction opposite to the distal direction against the internal annular ring via the internal concave curved surface.

Preferably, the internal comprises an internal chamfer which converges along the distal direction and which is adjacent to the groove distal rim.

Preferably, the needle comprises a proximal attachment interface, forming an internal conduit, by means of which the needle is fastened to the stem, preferentially by fitting the distal end of the shaft into the proximal fixation interface along the distal direction, the crown extending from the proximal attachment interface, in the direction opposite to the distal direction.

Preferably, the groove proximal rim is radially wider than the groove distal rim.

Preferably, the piston groove has a radial section in the form of a portion of a circle, from the groove distal rim to the groove proximal rim.

A further subject matter of the invention is a valve; comprising the piston-diaphragm assembly, as defined hereinabove. The valve comprises a body, having a central conduit coaxial with a central axis conduit and opening out at a distal end of a body belonging to the body. The piston can slide relative to the body along the central axis between a distal position and a proximal position, the distal direction of the piston being parallel to the central axis. The stem is received in the central conduit, protruding from the central conduit from the distal end of body when the piston is in the distal position. The needle is arranged outside the central conduit, being offset along the distal direction from the distal end of the body, whether the piston is in the proximal or distal position. The peripheral annular ring attaches the diaphragm to the distal end of body. The diaphragm separates the central conduit from a pressurized fluid chamber delimited beyond the diaphragm in the distal direction, and is configured to be elastically deformed between: an initial shape, when the piston is in the distal position and no overpressure occurs in the pressurized fluid chamber relative to the central conduit, and stretched shapes, under the effect of an overpressure occurring in the pressurized fluid chamber relative to the central conduit. The crown rim is in contact with the diaphragm, whether the diaphragm is in the initial shape or in one of the stretched shapes, and whether the piston is in the distal or proximal position.

A further subject matter of the invention is a manufacturing method for a piston-diaphragm assembly, as defined hereinabove. The method comprises: a fitting of the internal annular ring on the stem, while the needle is not yet fastened on the stem, the fitting of the internal ring being done via the stem distal end and until the internal annular ring is received in the piston groove to attach the diaphragm to the stem. The method comprises, while the internal annular ring is received in the piston groove, a fastening of the needle to the stem distal end, such that the crown surrounds the stem by externally covering the internal annular ring, and so that the diaphragm is radially interposed between the groove proximal rim and the crown rim, being in contact with the crown rim.

Preferably, the method comprises a positioning of a temporary cap on the stem distal end, while the needle is not yet fastened to the stem and the internal annular ring is not yet fitted onto the stem, the temporary cap covering the stem distal end, the internal annular ring being fitted onto the stem via the temporary cap, with sliding of the internal annular ring along an external tapered surface of the temporary cap, the external tapered surface being convergent along the distal direction. Preferably, the method then comprises a removal of the temporary cap, while the internal annular ring is accommodated in the groove piston, and before fastening the needle to the stem distal end.

BRIEF DESCRIPTION OF THE DRAWINGS

The invention will be clearer upon reading the following description, given only as an example, but not limited to, and making reference to the drawings wherein.

DETAILED DESCRIPTION

Figure 1:
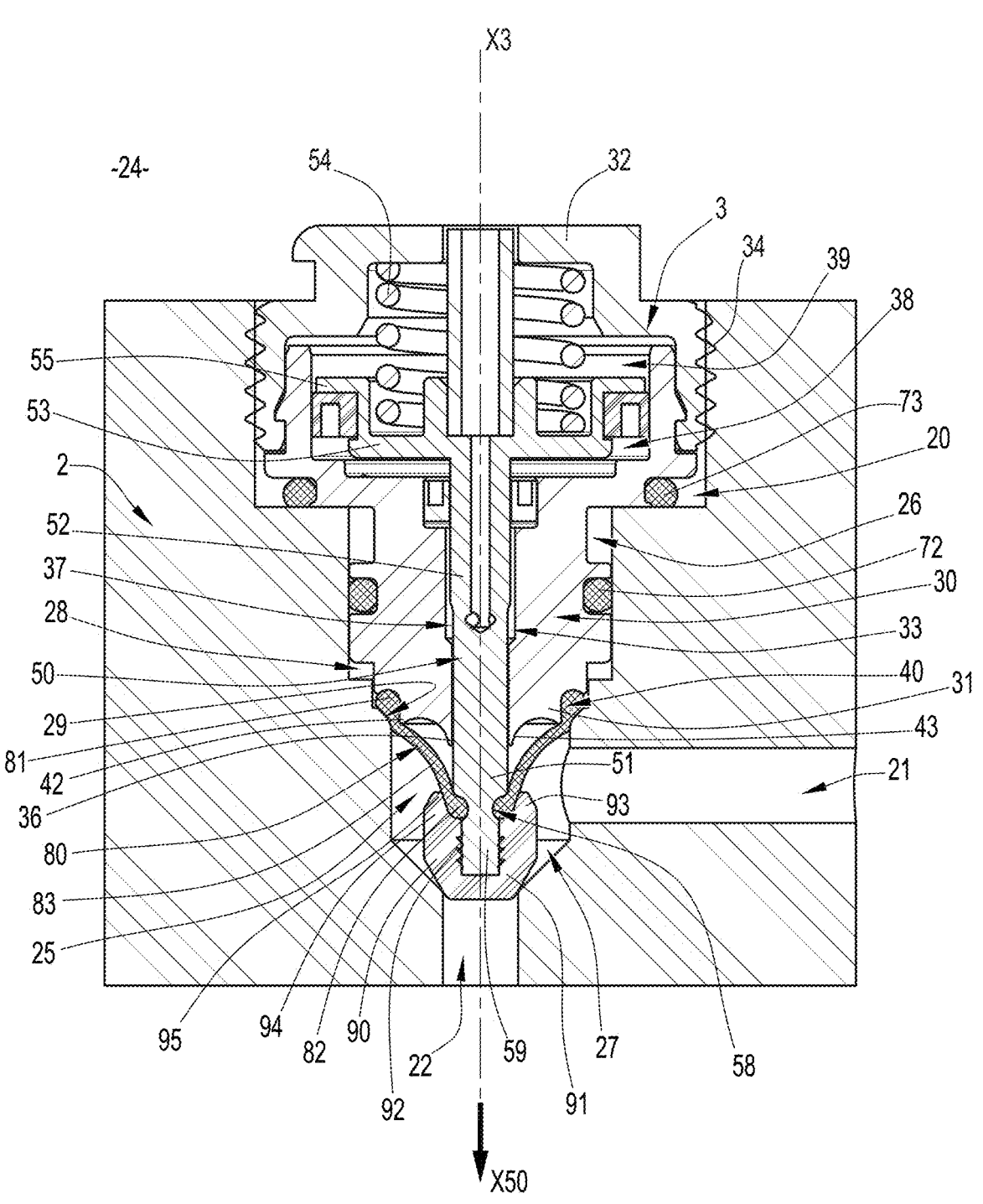
FIG. 1 is a longitudinal sectional view of a pressurized fluid apparatus comprising a valve with a piston in a distal position and a diaphragm in an initial shape.

FIGS. 1 to 4 show part of a device for applying a coating product. Such apparatus is e.g. a sprayer for paint, varnish, anticorrosion coating, or any other type of coating product that may be envisaged. The apparatus is a particular type of pressurized fluid apparatus, using at least two pressurized fluids, namely the coating product or other products used in the context of the coating, e.g. a solvent or components of the coating product, and a control fluid, e.g. compressed air. The coating product is a pressurized fluid in that same is used under a pressure comprised between 1 and 16 bar, preferably between 2 and 10 bar, in the apparatus. The above also applies to the case of a solvent or of a component of a coating product. The control fluid is a pressurized fluid in that same is used under a pressure comprised between 1 and 10 bar, preferably between 2 and 6 bar, in the apparatus.

The apparatus comprises a valve 3. The valve 3 is particularly suitable for installation in an apparatus for applying a coating product as described herein but can also be used with other types of pressurized fluid apparatus, such as pneumatic or hydraulic apparatus, using one or a plurality of pressurized fluids other than same described herein. In the present example, the valve 3 is intended to selectively interrupt and permit a pressurized fluid which is a coating product to flow. In the other aforementioned cases of application of the valve 3, the particular pressurized fluid can be replaced by another.

A base 2, which belongs to the apparatus or to the valve 3, forms a bore 20 and two pressurized fluid conduits, including an inlet conduit 21 for the coating product, and a discharge conduit 22 for the coating product. The conduits 21 and 22 open out into the bore 20. The bore 20 opens onto an outside 24 of the apparatus, i.e. same is advantageously open to the open air. The valve 3 is fixedly accommodated in the bore 20 by shutting off the bore 20. The valve 3 and the bore 20 define a common central axis X3. The central axis X3 passes through the bore 20 from the opening out to the bottom of the bore 20. In the present case, the discharge conduit 22 is centered on the axis X3. A distal direction X50 is also defined, directed parallel to the axis X3, towards the bottom of the bore 20. Unless otherwise stated, terms such as "distal", "proximal", "radially" and "axially" are indicated with reference to the axis X3 and to the direction X50.

Figure 2:
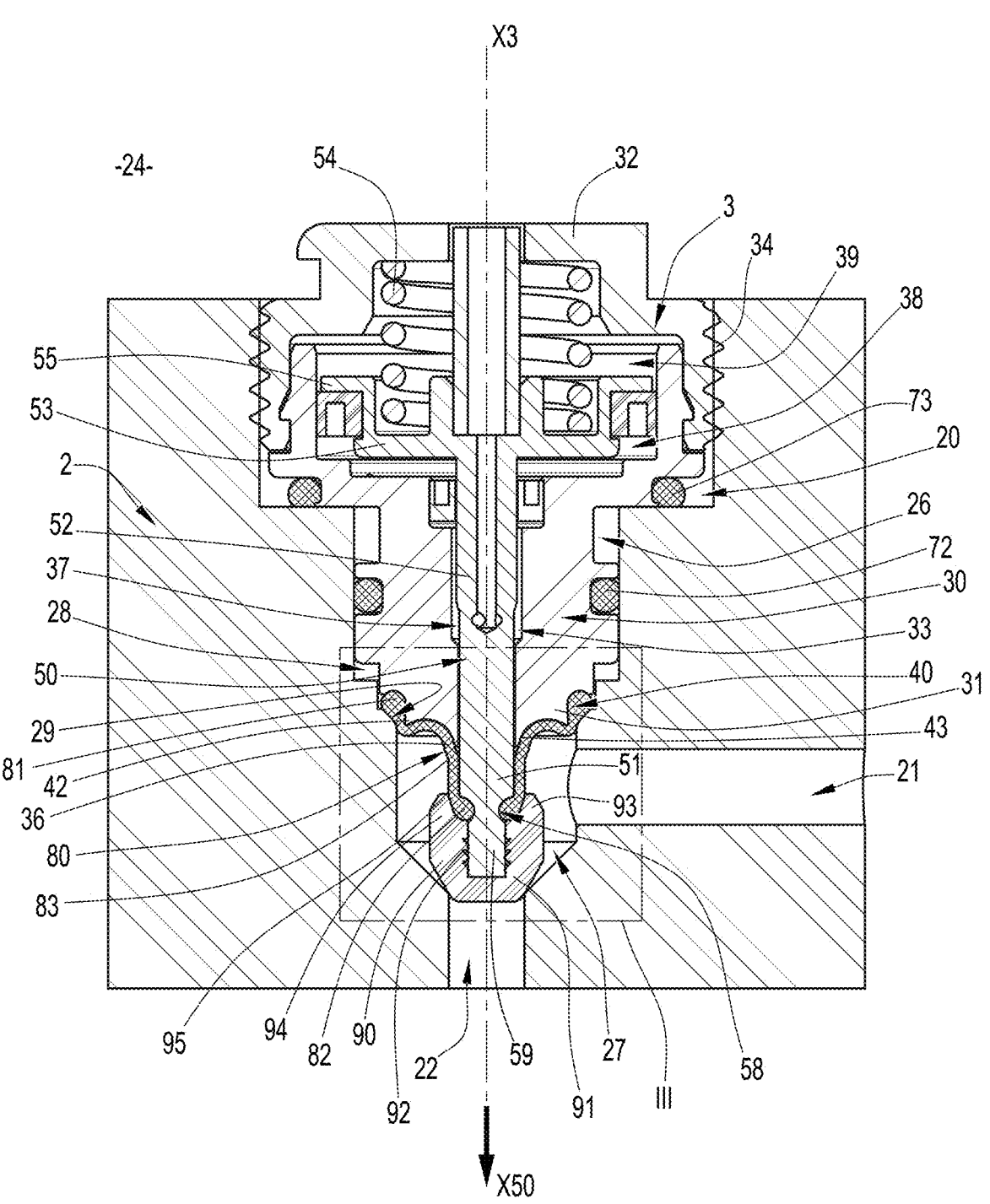
FIG. 2 is a view similar to FIG. 1, with the piston in the distal position and the diaphragm in a distal stretched shape.
Figure 3:
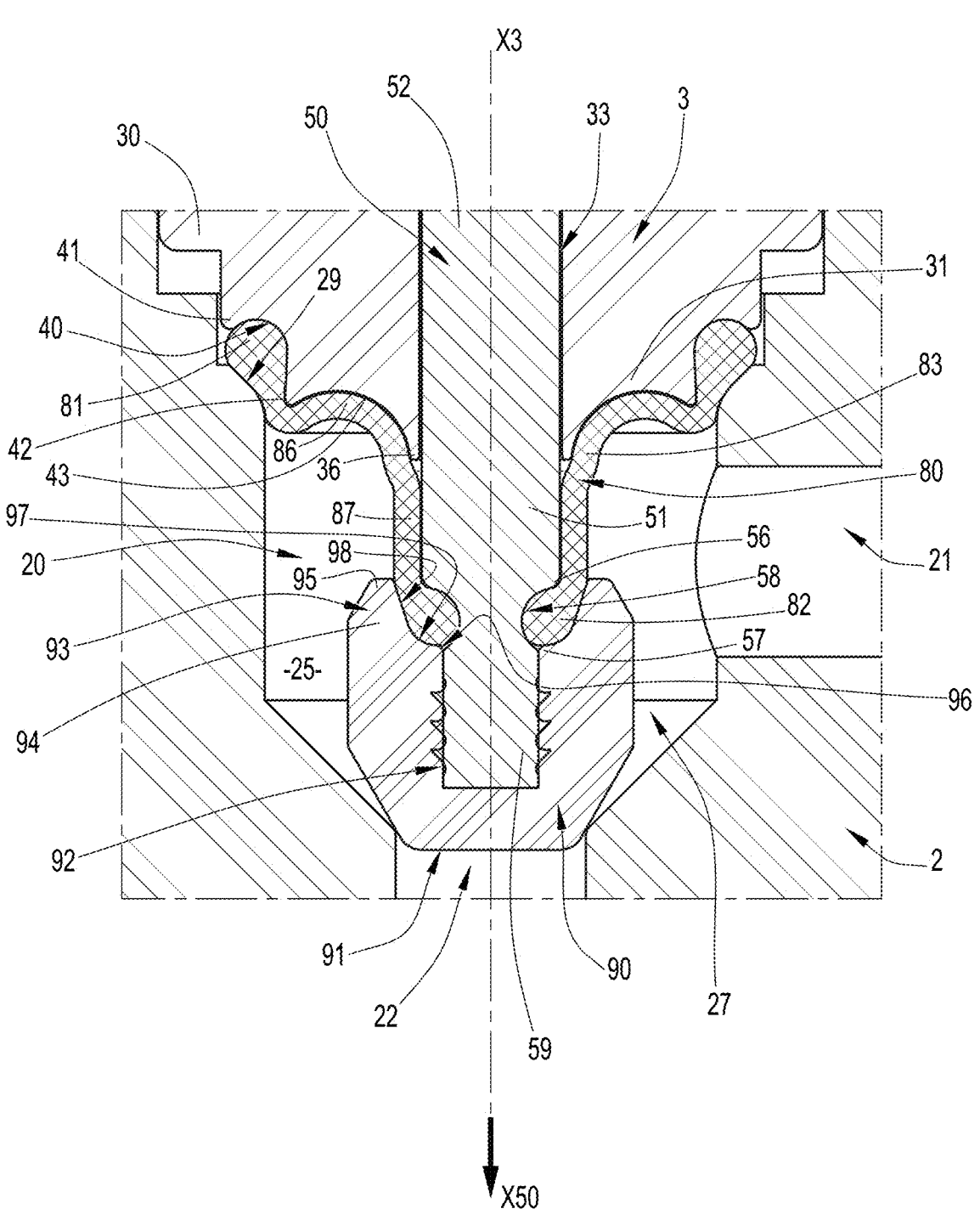
FIG. 3 is a magnified view of a detail shown in FIG. 2.
Figure 4:
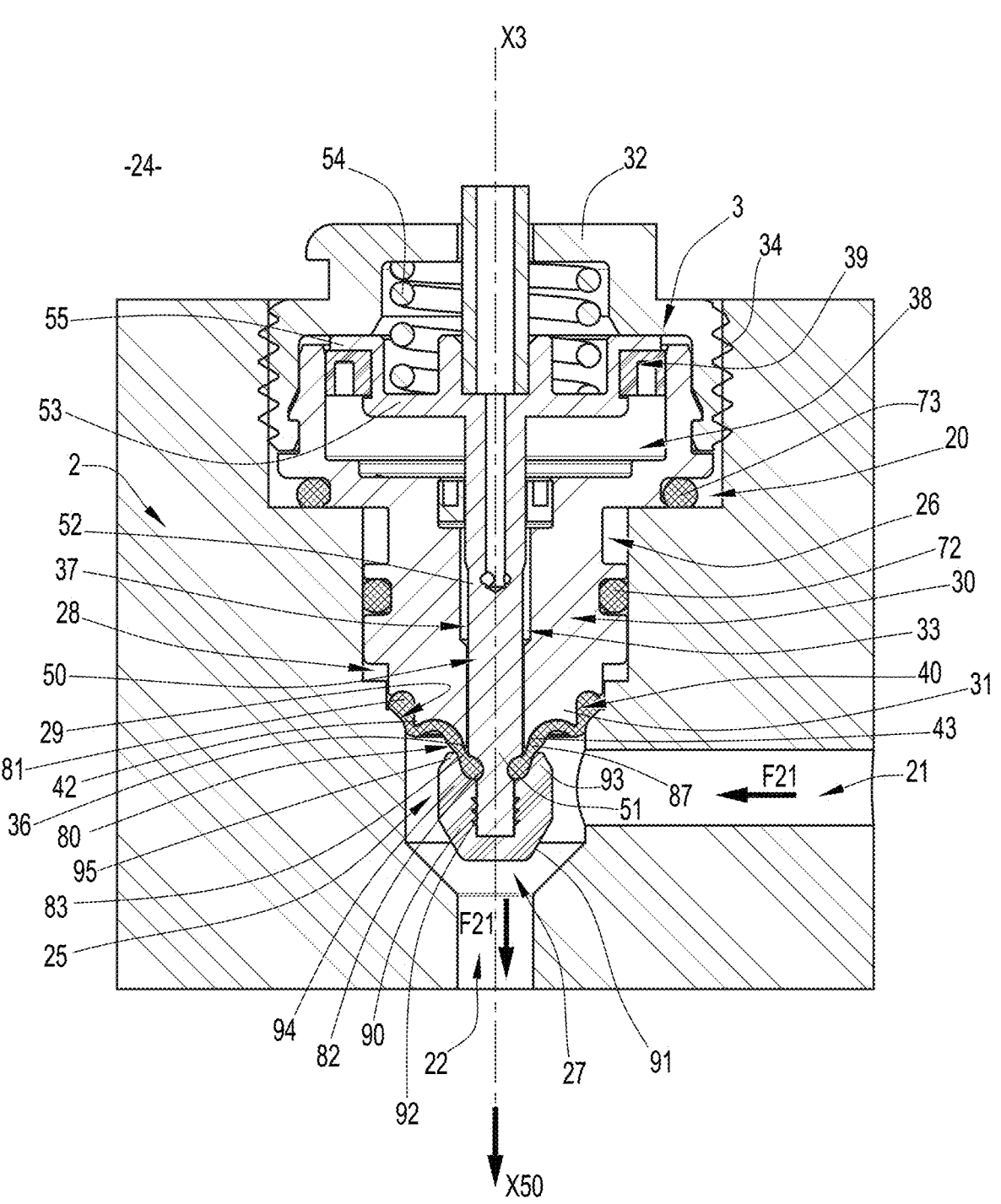
FIG. 4 is a view similar to FIGS. 1 and 2, with the piston in a proximal position and the diaphragm in a proximal stretched shape.

The conduits 21 and 22 open out into a zone of the bore 20 which delimits a pressurized fluid chamber 25, herein the coating product. A shut-off seat 27 is formed at the opening out of the conduit 22 into the chamber 25, herein coaxially with the axis X3. As shown in FIG. 4, a pressurized fluid flow F21, which is herein a coating product, is intended to circulate successively in the conduit 21, the chamber 25 and the conduit 22, via the seat 27, when the valve 3 is in an open configuration. When the valve 3 is in a closed configuration as shown in FIGS. 1 to 3, the flow F21 is interrupted by the valve 3, which shuts off the seat 27.

A control fluid conduit (not shown), opens out into a zone of the bore 20 which delimits a chamber 26, called the "peripheral control chamber", which extends between the chamber 25 and the opening out of the bore 20 to the outside 24. A flow of control fluid circulates between the control fluid conduit and the peripheral control chamber 26 to mechanically control the valve 3. The control fluid may be pressurized air.

The valve 3 comprises a body 30. The central axis X3 is fixed with respect to the body 30. Along the axis X3, the body 30 has a distal end 31 called the "body distal end" and a proximal end 32 called the "body proximal end", which are opposite and traversed by the axis X3.

The valve 3 is accommodated and attached in the bore 20 by means of the body 30. In order to be attached to the bore 20, the body 30 advantageously comprises an external thread 34, herein centered on the axis X3, or any other appropriate means of attachment, cooperating with a matching means of attachment belonging to the base 2, herein an internal thread matching the external thread 34, formed inside the bore 20 near the opening out. In the example, the thread 34 is arranged inside the proximal end 32.

Thereby accommodated in the bore 20, the valve 3 delimits, along with the bore 20, the pressurized fluid chamber 25 at the bottom of the bore 20, along the distal direction X50 with respect to the valve 3.

The body proximal end 32 is arranged at the opening out of the bore 20, towards the outside 24. The control chamber 26 is delimited radially between the body 30 and the bore 20 of the base 2. Preferably, a peripheral chamber 28, called a "vent chamber", is delimited radially between the body 30 and the bore 20 of the base 2, axially between the chamber 25 and the chamber 26. More particularly, the thread 34 is arranged between the proximal end 32 and the control chamber 26.

The body 30 forms a central conduit 33 coaxial with the axis X3 and traversed by the axis X3 throughout the length thereof. The conduit 33 extends through the body 30 from one side to the other. The central conduit 33 opens out at the body distal end 31 and at the body proximal end 32.

At the body distal end 31, the central conduit 33 defines a conduit distal end 36, which terminates the central conduit 33 and which opens out at the body distal end 31. In a direction opposite to the distal direction X50, starting from the conduit distal end 36, and successively along the axis X3, the central conduit 33 advantageously delimits, inside the body 30, an intermediate chamber 37, a control chamber 38 and a proximal chamber 39. The chambers 37, 38 and 39 are traversed by the axis X3.

The valve 3 further comprises a piston 50.

The piston 50 is accommodated in the central conduit 33 and is configured to slide with respect to the body 30 along the axis X3, being guided, for the sliding, by the central conduit 33. The piston 50 slides between a distal position, which is a closing position, to thereby obtain the closing configuration of valve 3 shown in FIGS. 1 to 3, and a proximal position, which is an opening position, to thereby obtain the opening configuration of the valve 3 shown in FIG. 4. In the distal position, the piston 50 along offset in the direction X50 with respect to the proximal position. In said positions, the piston 50 protrudes out from the central conduit 33 along the direction X50, from the conduit distal end 36 and hence from the body distal end 31, into the chamber 25.

The valve 3 further comprises a diaphragm 80. The diaphragm 80 is an elastically deformable part, unlike other parts such as the piston 50 and the body 30, which are rigid.

The diaphragm 80 comprises a peripheral ring 81 for attaching the diaphragm 80 to the body distal end 31 and surrounding the piston 50. The diaphragm 80 comprises an internal annular ring 82 attaching the diaphragm 80 to the piston 50 and surrounding the piston 50. The diaphragm 80 comprises an annular membrane 83 radially connecting the peripheral annular ring 81 to the internal annular ring 82, forming a continuous surface all around the piston 50. Thereby, the diaphragm 80, in particular by means of the membrane 83, separates the central conduit 33 from the pressurized fluid chamber 25, delimited beyond the diaphragm 80 along the direction X3. The rings 81 and 82 are preferentially both centered on the axis X3. Each ring 81 and 82 has preferentially a circular shape about the axis X3 and extends in a respective plane perpendicular to the axis X3. The ring 82 is movable at the same time as the piston 50 by being attached to the piston 50, whereas the ring 81 is fixed regardless of the position of the piston 50, by being attached to the body 30. The membrane 83 deforms elastically so as to always connect the rings 81 and 82, regardless of the position of the piston 50 relative to the body 30.

The diaphragm 80 has a geometry of revolution about the axis X3, i.e. that same advantageously has a radial or close to radial cross-section identical all around the axis X3.

The diaphragm 80 is traversed by the piston 50, which extends through the internal annular ring 82 and protrudes out into the chamber 25. The diaphragm 80 and the bottom of the bore 20 together delimit the chamber 25. In other words, the diaphragm 80 borders the chamber 25. The diaphragm 80 provides dynamic sealing to the pressurized fluid around the piston 50, between the chamber 25 and the body distal end 31, more particularly between the chamber 25 and the central conduit 33. Preferably, it is also the diaphragm 80 which shuts off the bore 20, around the body 30, opposite the outside 24, as discussed in detailed hereinafter.

Preferably, the body distal end 31 forms an annular cradle 43 and, preferentially, a body groove 40. The annular cradle 43 is formed around the conduit distal end 36. The body groove 40 is formed around the cradle 43, and hence around the conduit distal end 36. The groove 40 extends all around the body 30, about the axis X3, in a plane perpendicular to the axis X3. The groove 40 borders the cradle 43 throughout the outer periphery of the cradle 43, so as to delimit the cradle 43. Preferably, the body groove 40 is open toward the outside.

Advantageously, provision is made for the peripheral annular ring 81 to be accommodated in the body groove 40, in order to be positioned safely on the body 30. Preferably, the ring 81 is held in a slightly deformed state by the body groove 40, in that the body groove 40 bears radially outwards on the ring 81, with respect to the central axis X3. The ring 81 is thereby held in the deformed state, wherein the ring 81 is elastically stretched radially outwards, with respect to the central axis X3. In a non-deformed state, the ring 81 preferentially has a circular radial section, i.e. is toroidal. In the deformed state shown in FIGS. 1 to 4, the ring 81 is preferentially slightly flattened by the body groove 40 for a part of the peripheral annular ring 81 against which the body groove 40 bears radially outwards. The ring 81 is thereby held slightly on the body by the groove 40, in particular during assembly when the body 30 is not yet accommodated in the bore 20.

Preferably, in order to attach the peripheral annular ring 81 to the body 30 while delimiting the chamber 25 so as to be sealed against the coating product, the peripheral annular ring 81 is radially interposed between the body 30 and the bore 20. The ring 81 thereby separates the chamber 25 from the rest of the bore 20 and is held in the groove 40 by the bore 20. Pressurized fluid present in the chamber 25 cannot then escape to the outside 24 along the body 30. More particularly, the bore 20 comprises an internal conical surface 29, which is centered on the axis X3 and which converges along the direction X50. The surface 29 bears obliquely, along the axis X3, in the direction opposite to the direction X50, against the peripheral annular ring 81. Thereby, the ring 81 is interposed radially between the surface 29 and the groove 40 in order to seal the chamber 25.

More particularly, the ring 81 fluidly separates the chamber 25 from the vent chamber 28, which are adjacent to said ring 81. The ring 81 thus prevents a leakage of coating product from the chamber 25 toward the vent chamber 28, or even toward the control chamber 26. In a variant, it is provided that it is not the ring 81 which ensures the sealing, but a static seal distinct from the diaphragm, radially interposed between the body 30 and the bore 20.

Preferably, to facilitate the mounting of the ring 81 in the body groove 40, the body groove 40 is open, not only toward the outside, but also along the distal direction X50. The ring 81 is nevertheless held in place in the groove 40 by means of the abutment of the bore 20 against the ring 81.

In greater detail, as can be seen more clearly in FIG. 3, the body groove 40 comprises a groove proximal rim 41 and a groove distal rim 42, between which the body groove 40 is delimited. The rim 41 forms a circular protruding rim which extends around the axis X3 in a plane perpendicular to the axis X3. The rim 42 is offset along the direction X50 with respect to the rim 41. The rim 42 forms a circular protruding rim which extends around the axis X3 in a plane perpendicular to the axis X3. The rim 42 marks the boundary between the groove 40 and the annular cradle 43. The rim 41 has a larger diameter than the rim 42, and the rim 42 is arranged along the direction X50 with respect to the rim 41. Preferably, the groove 40 has a radial profile which, starting from the rim 42, is first parallel or almost parallel to the axis X3, which then rotates outwards as far as the rim 41. In other words, the groove 40 is recessed in the direction opposite to the distal direction X50 but is not recessed or is slightly recessed radially inwards, which facilitates the insertion of the ring 81 into the groove 40 in the direction opposite to the distal direction X50.

In order to delimit the control chamber 26 so as to be sealed to the control fluid, the valve 3 advantageously includes a static seal 72 and a static seal 73, which are e.g. O-rings. The chamber 26 is delimited axially by the seals 72 and 73, extending axially between the seals 72 and 73. Each seal 72 and 73 surrounds the body 30 throughout the periphery thereof, around the axis X3. Each seal 72 and 73 is interposed between the body 30 and the bore 20, radially with respect to the axis X3. More particularly, the seal 72 is arranged axially between the ring 81 and the seal 73. The seal 72 fluidly separates the chamber 26 from the vent chamber 28, which are adjacent to the seal 72, to prevent control fluid coming from the chamber 26 from escaping to the vent chamber 28, or even to the chamber 25, by flowing along the body 30. The seal 73 separates the chamber 26 from the opening out of the bore 20. The seal 73 thus prevents a leakage of control fluid from the chamber 26 toward the thread 34, or even toward the outside 24.

The annular cradle 43 of the body 30 extends radially between the central conduit 33 and the peripheral annular ring 81, more particularly between the body groove 40 and the conduit distal end 36. More precisely, the cradle 43 is delimited internally by the conduit distal end 36 and externally by the groove distal rim 42. The annular cradle 43 advantageously has a shape of revolution about the axis X3. Preferably, the annular cradle 43 has a rounded radial section, recessed in the direction opposite to the direction X50. More precisely, the rounded radial section has a hollow curvature without any ripple. More generally, as shown in the Figures, the annular cradle 43 is concave towards the annular membrane 83. Preferably, the end 36, which forms a circular rim bordering the cradle 43 from the inside, is arranged along the direction X50 with respect to the rim 42, which borders the cradle 43 from the outside. The rim 42 advantageously has a greater diameter than the end 36. The rounded radial section connects the end 36 to the rim 42.

The piston 50 comprises a stem 52 and a needle 90.

The stem 52 extends parallel to the direction X50 and is coaxial with the axis X3. The stem is accommodated in the central conduit 33. More particularly, the stem 52 emerges into the chamber 25, then successively extends through the conduit distal end 36 and the intermediate chamber 37 and emerges into the control chamber 38. Preferably, the piston 50 is guided in sliding by the radial sliding of the stem 52 along a wall of the intermediate chamber 37. In other words, the piston 50 is guided in sliding by means of the stem 52, by the central conduit 33 of the body 30.

The stem 52 comprises, successively along the direction X50, a part 51, a piston groove 58 and a stem distal end 59.

It is advantageously provided that the part 51 cooperates with the conduit 33 so that the stem 52 guides the sliding of the piston 50. In the distal position of the piston 50 as shown in FIGS. 1 to 3, the part 51 protruding out from the conduit 33 along the direction X50, i.e. extending beyond the end 31 and the end 36. In the proximal position of the piston 50, as shown in FIG. 4, the part 51 is retracted inside the conduit 33, preferably entirely, or almost entirely.

The piston groove 58 is arranged so as to be outside the central conduit 33, whatever the position of the piston 50. The piston groove 58 surrounds the stem 52 throughout the periphery around the central axis X3 and is open radially outwards with respect to the central axis X3. The piston groove 58 advantageously extends along a plane perpendicular to the axis X3.

As can be seen more clearly in FIG. 3, the piston groove 58 comprises a groove proximal rim 56 and a groove distal rim 57, between which the piston groove 58 is delimited. The rim 57 is offset along the direction X50 with respect to the rim 56. The rim 56 advantageously forms a circular projecting rim which extends around the axis X3, along a plane perpendicular to the axis X3. The rim 56 preferentially has a radial profile with a rounded fillet so as not to be cutting. The rim 56 marks the boundary between the groove 58 and the part 51. The rim 57 is offset along the direction X50 with respect to the rim 56. The rim 57 forms a circular protruding rim which extends around the axis X3 in a plane perpendicular to the axis X3. The rim 57 marks the boundary between the groove 58 and the stem distal end 59. Preferably, the piston groove 58 has a radial section in the form of a portion of a circle, recessed, from the rim 56 to the rim 57. In other words, the groove 58 describes a toroidal portion about the axis X3.

In order for the diaphragm 80 to be attached to the piston 50, the internal annular ring 82 is accommodated in the piston groove 58. Preferably, the ring 82 is held in a slightly deformed state by the piston groove 58, in that the piston groove 58 bears radially outwards on the ring 82, with respect to the central axis X3. The ring 82 is thereby held in the deformed state, wherein the ring 82 is elastically stretched radially outwards, with respect to the central axis X3. In a non-deformed state, the ring 82 preferentially has an elliptical radial section, inclined, converging along the direction X50. In the deformed state shown in FIGS. 1 to 4, the ring 82 is preferentially rounded by the piston groove 58 for a part of the annular ring 82 against which the groove 58 bears radially outwards. The ring 82 is thereby attached to the stem 52 by the groove 58, in particular during assembly when the needle 90 is not yet attached to the stem 52.

Advantageously, provision is made for the groove proximal rim 56 to be radially wider than the groove distal rim 57, which facilitates the mounting of the retaining ring 82 on the stem 52 by fitting on in the direction opposite to the direction X50, via the distal end 59, as explained hereinafter. Nevertheless, unlike the groove 40, provision is advantageously made for the groove 58 to be recessed radially inwards, so that the ring 82 is attached to the stem by the groove 58, even when the needle 90 is not yet in place.

The membrane 83 is of constant thickness, or with slight variations from the ring 81 to the ring 82. The diaphragm 80, in particular the membrane 83, is configured to be elastically deformed depending on the current position of the piston 50 and of the occurrence of an overpressure of pressurized fluid in the chamber 25 with respect to the central conduit 33. Preferably, the membrane 83 has a shape of revolution about the axis X3.

"Occurrence of an overpressure" means that pressurized fluid 25 is present in chamber 25 with a pressure of a value greater than that of the pressure of a fluid, which may be air, present on the other side of diaphragm 80, in particular in the central conduit 33. In such case, the difference in value between the pressure of the pressurized fluid in the chamber 25 and in the conduit 33 is greater than a certain pressure differential threshold, which is not negligible. When the difference in value between the pressure of the pressurized fluid in the chamber 25 and in the conduit 33 is less than a given pressure differential threshold, tending toward zero, it is considered that there is no overpressure.

More particularly, the diaphragm 80 takes an initial shape, shown in FIG. 1, when no overpressure occurs in the chamber 25 with respect to the central conduit 33 and the piston is in the distal position. The initial shape can be considered as a rest position of the diaphragm 80, toward which the diaphragm naturally returns by elasticity when the pressures in the chamber 25 and in the conduit 33 have close or identical values. In the initial shape, the annular membrane 83 is distant from the cradle 43, preferably throughout the surface of the annular membrane 83. Preferably, the annular membrane 83 is also distant from the stem 52, in particular from the part 51 of the stem 52. If appropriate, the membrane 83 is in contact with the stem only at the rim 56 and in contact with the cradle 43 only at the rim 42. An annular volume is thereby provided between the annular membrane 83 and the cradle 43, between the rims 42 and 56. In the initial shape, as shown in FIG. 1, the membrane 83 preferentially has a generally flared or conical shape, curved, if appropriate, along the direction of the cradle 43, preferably without any undulation.

As shown in FIGS. 2 to 4, when an overpressure occurs in the chamber 25 with respect to the conduit 33, the diaphragm 80 is elastically deformed toward a stretched shape. Depending on the situation, and in particular, depending on the position of the piston 50, the stretched shape may be different. In all the stretched shapes that can be taken, the annular membrane 83 comes in contact and mates with the annular cradle 43, under the effect of the overpressure, which presses the annular membrane 83 against the annular cradle 43. By mating with the cradle 43, the membrane 83 takes a shape which matches the shape of the cradle. To obtain one of the stretched shapes, it is necessary for the overpressure to be sufficiently intense to elastically deform the membrane 83 until the membrane 83 comes to bear against the annular cradle 43 in the direction opposite to the direction X50. Since the cradle 43 thereby accommodates the membrane 83 in abutment in the direction opposite to the direction X50, same retains the membrane 83 against the effect of the overpressure, so that the membrane 83 is not excessively stretched. The above prevents a deterioration of the membrane in the event of excessive overpressure. Furthermore, the shape of the cradle 43 ensures that the membrane 83 is deformed exactly according to the desired shape given by the cradle 43, since the membrane 83 mates with the cradle 43. The above further reduces the risk of deterioration to the membrane 83.

The diaphragm 80 can be elastically deformed toward a particular stretched shape, called a "distal stretched shape" and shown in FIGS. 2 and 3, not only when an overpressure occurs in the chamber 25, but also when the piston 50 is in the distal position. In the distal stretched shape, only a proximal part 86 of the membrane 83 is in contact and mates with the cradle 43, whereas a distal part 87 is in contact and mates with the stem 52, for the part 51 which protrudes out from the end 36 of the conduit 33. Given the distal position of the piston 50, the part 51 then extends axially between the annular cradle 43, more particularly the end 36, and the internal annular ring 82, more particularly the groove 58.

In more detail, the proximal part 86 has an annular shape and extends from the ring 81 to the distal part 87. The distal part 87 has an annular shape and extends from the proximal part to the ring 82. Preferably, the distal part 87 and the proximal part 86 each represent about half the surface area of the membrane 83. Preferably, almost the entire distal part 87 is in contact with the part 51 of the stem 52. Preferably, almost the entire the proximal part 86 is in contact with the cradle 43. Similarly, almost the entire cradle 43, from the rim 42 to the end 36, is in contact with the membrane 83. Similarly, almost the entire part 51 of the stem 52 which emerges from the conduit 33, from the end 36 to the rim 56, is in contact with the membrane 83. If appropriate, a part of the membrane 83 situated at the boundary between the distal 87 and proximal 86 parts is not pressed against the cradle 43 or the stem 52, at the end 36.

The fact that the membrane 83 mates with both the part 51 of the stem 52 and the cradle 43 in the above situation, reduces the risks of deterioration of the membrane 83.

The diaphragm 80 can be elastically deformed toward a particular stretched shape, called the "proximal stretched shape" and shown in FIG. 4, not only when an overpressure occurs in the chamber 25, but also when the piston 50 is in the proximal position. In such case, the part 51 of the stem 52 is retracted inside the conduit 33. Preferably, in such case, almost the entire membrane 83 is in contact with the cradle 43. Similarly, almost the entire cradle 43, from the rim 42 to the end 36, is in contact with the membrane 83. More particularly, the proximal part 86 and the distal part 87 are both in contact with the cradle 43, preferentially almost entirely. The fact that the membrane 83 mates almost entirely with the cradle 43 in such situation, reduces the risks of deterioration of the membrane 83.

In the initial shape, it is preferable for the annular membrane 83 to be convex toward the annular cradle 43, i.e. to have a curvature the back of which is oriented toward the annular cradle 43, as shown in FIG. 1. The initial curvature ensures that the membrane 83 will take the other shapes described hereinabove when an overpressure occurs. Advantageously, when the diaphragm 80 is in the initial shape, none of the parts 86 and 87 are in contact with the cradle 43 and the stem 52, except, if appropriate, with the rims 42 and 56.

Preferably, in all the shapes that the diaphragm 80 may take during the use of the valve, or at least for stretched shapes, provision is advantageously made that no surface of the annular membrane 83 comes in contact with another surface of the annular membrane 83. In other words, the annular membrane 83 is not folded to the point of coming in contact against itself, which makes it possible to reduce the risk of deterioration of the membrane 83. More generally, provision can be made that no fold of the membrane 83 occurs, due to the abovementioned initial and stretched shapes, in particular by pressing the membrane 83 against the cradle 43 for the stretched shapes, the shape of the cradle 43 being specifically configured to prevent a sharp folding of the membrane 83.

In the absence of overpressure and while the piston 50 is in the proximal position, the membrane 83 advantageously takes the same shape as the proximal stretched shape. However, provision can be made for the membrane 83 to take a different intermediate shape, in particular wherein the membrane 83 does not come entirely in contact with the cradle 43.

Still other stretched shapes can be obtained when the overpressure occurs and the piston 50 is in an intermediate position between the distal position and the proximal position. Moreover, in all intermediate situations where either a too low overpressure occurs, or the piston 50 is not in the distal position, or both, the diaphragm 80 may take a respective intermediate shape, which is neither the initial shape nor one of the stretched shapes as described hereinabove.

Whether the piston 50 is in the proximal or distal position, the needle 90 is preferably entirely arranged in the chamber 25, outside the central conduit 33, being offset along the distal direction X50 with respect to the body distal end 31. The needle 90 is attached to the stem 52 by the stem distal end 59. The needle 90 is a part distinct from the stem 52, which is attached to the stem 52 by being directly mounted on the stem 52. The stem distal end 59 starts from the piston groove 58, along the direction X50 and is advantageously coaxial with the axis X3. In the proximal position of the piston 50, the needle 90 is distant from the seat 27 to allow the flow F21 to circulate, and, in the distal position of the piston 50, bears axially against the seat 27 to shut off the conduit 22 and prevent the flow F21 from circulating.

In more detail, the needle 90 advantageously comprises a shut-off distal end 91, a proximal attachment interface 92 and a crown 93, which together advantageously form a one-piece integral part.

The needle 90 is attached to the stem distal end 59 by the proximal attachment interface 92. Preferably, the proximal attachment interface 92 is in the form of an internal conduit centered on the axis X3, opening out in the direction opposite to the distal direction X50, accommodating therein the stem distal end 59 sleeved along the distal direction X50. Preferably, the attachment is obtained by force sleeving the needle 90 onto the stem 52, more particularly the interface 92 onto the distal end 59. As shown in the Figures, provision is advantageously made for the distal end 59 to have claws arranged at the periphery of the end 59 and which are radially implanted in the interface 92 to retain the needle 90 in the direction opposite to the distal direction X50. In a variant, instead of sleeving the needle 90 onto the stem distal end 59, it is possible to provide for screwing the needle 90 onto the stem distal end 59. The proximal attachment interface 92 then has an internal thread and the stem distal end 59 has an external thread matching the internal thread so that screw tightening can be carried out.

The shut-off end 91 extends along the distal direction from the interface 92 and from the end 59. The shut-off end 91 preferentially has a convex shape or is in the form of a plug along the direction X50. When the stem 52 is in the distal position as shown in FIGS. 1 to 3, the end 91 comes to bear along the distal direction X50 against the closing seat 27, to thereby shut off the shut-off seat 27. The conduit 22 is then fluidically separated from the chamber 25, preventing the establishment of the flow F21. When the stem 52 is in the proximal position as shown in FIG. 4, the end 91 is set back with respect to the shut-off seat 27 in the direction opposite to the direction X50, to thereby liberate the shut-off seat 27. The conduit 22 is then fluidically connected to the chamber 25, so that the flow of fluid F21 can be established.

The crown 93 is formed at a proximal end of needle 90, i.e. axially opposite the shut-off end 91. The bottom of the internal conduit of the interface 92 is arranged between the crown 93 and the end 91. The crown 93 surrounds the stem 52 throughout the periphery thereof, at the groove 58, and externally covers the internal annular ring 82, whereas the internal annular ring 82 is radially interposed between the crown 93 and the groove 58.

In more detail, the crown 93 comprises a base 94 and a crown rim 95. Preferably, the crown 93 forms, on the inside of the crown 93, successively in the direction opposite to the distal direction X50, an internal chamfer 96, an internal concave curved surface 97, then an internal conical surface 98, as indicated in FIG. 3. The surfaces 96, 97 and 98 together form a continuous flared internal wall surrounding the stem 52.

The base 94 advantageously starts at a proximal end of the interface 92. In other words, the crown 93 extends in the direction opposite to the direction X50 from the internal conduit formed by the interface 92. The crown rim 95, arranged in the direction opposite to the distal direction X50 with respect to the base 94, advantageously forms a proximal end of the needle 90 and of the crown 93.

The base 94 connects the crown 93 to the shut-off distal end 91 and starts at a proximal end of the interface 92. The base 94, which has an annular shape surrounds the stem 52. In the direction opposite to the direction X50, the base 94 starts adjacent to the groove distal rim 57 and extends in the direction opposite to the direction X50 away from the stem 52 radially outwards to the crown rim 95, which ends the crown 93 in the direction opposite to the direction X50, being radially distant from the stem 52. The crown rim 95, preferably of circular shape, extends all around the stem 52, in a plane orthogonal to the axis X3. The crown rim 95 is arranged at the height of the groove proximal rim 56, i.e. at the same level as the proximal groove rim 56 along the axis X3, or even beyond the proximal groove rim 56 in the direction opposite to the direction X50. The crown 93 thereby completely covers the groove 58, extending radially at a distance from the groove 58, starting from the distal rim 57 where the crown 93 is adjacent to the distal rim 57.

The internal chamfer 96 converges along the distal direction X50 and is adjacent to the groove distal rim 57. The chamfer 96 serves to prevent a cutting rim from being formed at the boundary between the needle 90 and the stem 52, thereby avoiding a risk of deterioration of the ring 82 during use.

The concave internal curved surface 97, of rounded hollow shape, connects the base 94 to the crown rim 95, more particularly connects the chamfer 96 to the conical internal surface 98. The surface 97 starts from the chamfer 96, so that the groove distal rim 57 is offset along the direction X50 with respect to the beginning of the surface 97. The internal concave curved surface 97 converges along the distal direction X50.

The internal conical surface 98 connects the base 94 to the crown rim 95, more particularly connects the internal concave curved surface 97 to the crown rim 95. The surface 98 converges along the distal direction X50.

The internal annular ring 82 being accommodated in the groove 58, same is interposed between the crown 93 and the stem 52, radially with respect to the axis X3, being in contact with the crown 93, preferentially throughout or over most of the height thereof. More particularly, the ring 82 is in contact with the surfaces 97 and 98. The crown 93 bears obliquely in the direction opposite to the distal direction X50 against the internal annular ring 82 via the internal concave curved surface 97. The inclined bearing enables the retaining ring 82 to be held by the needle 90 in the groove 58, so that the retaining ring 82 is held attached to the stem 52. The crown 93 bears obliquely in the direction opposite to the distal direction X50 against the diaphragm 80, more particularly against the ring 82, via the internal conical surface 98. The above contributes to holding the retaining ring 82 in the groove 58.

The distal part 87 of the membrane 83, by means of which the membrane 83 is attached to the retaining ring 82, is interposed between the groove proximal rim 56 and the crown rim 95, radially with respect to the axis X3, by being in contact with the crown rim 95. More generally, the diaphragm 80 is radially interposed between the groove proximal rim 56 and the crown rim 95, being in contact with the crown rim 95.

In other words, the diaphragm 80 bears against the crown 93 over the entire surface of the diaphragm 80 which is radially interposed between the crown 93 the stem 52, in particular at the crown rim 95, and, if appropriate, apart from a distal end of the ring 82 at the rim 57. Preferentially, the crown rim 95 is kept in contact with the diaphragm 80, whether the diaphragm 80 is in the initial shape, in one of the stretched shapes, or in any other shape during the use thereof. Preferably, the crown rim 95 is kept in contact with the diaphragm 80, whether the piston 50 is in the distal position, in the proximal position, or in any intermediate position. Maintaining the support between the crown rim 95 and the diaphragm 80, all around the axis X3, prevents the opening any annular gap between the diaphragm 80 and the needle 90, which avoids the insertion and the accumulation of residues or of other materials between the diaphragm 80 and the crown 93. In order to maintain contact between the crown rim 95 and the diaphragm 80 in all such situations, provision is made that, when the needle 90 is attached, the crown 93 is pushed in on the diaphragm 80 so as to apply a force in the direction opposite to the direction X50, so as to maintain the diaphragm 80 in an elastically deformed configuration, in compression in the direction opposite to the direction X50. More particularly, provision is made for the ring 82 and the part 87 of the membrane 83 to be maintained in the elastically deformed state by inclined bearing of the surfaces 96 and 97 and of the rim 95 against the ring 82 and the part 87 of the membrane 83.

Preferably, the stem 52 comprises a proximal base 53 and a collar flange 55, which are at a proximal end of the stem 52, opposite the part 51 and the needle 90. Between, on the one hand, the base 53 and the collar flange 55 and, on the other hand, the part 51 and the needle 90, the stem 52 extends through the intermediate chamber 37 and the control chamber 38 of the central conduit 33. The collar flange 55 separates the control chamber 38 from the proximal chamber 39. The proximal base 53, formed at a proximal end of the piston 50, is opposite the needle 90. The proximal base 53 is arranged in the proximal chamber 39.

The valve 3 advantageously comprises a spring 54 which exerts an elastic return force on the piston 50, herein via the proximal base 53, bearing on the body 30. The elastic return force tends to move the piston 50 along the direction X50, from the proximal position thereof to the distal position thereof. Preferably, the spring 54 is arranged inside the body 30, herein in the proximal chamber 39 around the piston 50.

The control chamber 26, delimited by the base 2, is fluidically connected to the control chamber 38 formed inside the body 30. For this purpose, the body 30 forms one or a plurality of conduits (not shown), connecting the chambers 26 and 38 when the body 30 is mounted on the base 2. The control fluid can thus penetrate into the control chambers 26 and 38, and thereby exert a pressure force on the collar flange 55 by pressurizing the chamber 38, tending to move the piston 50 from the distal position to the proximal position, against the force developed by the spring 54. The application of the pressure force by pressurizing with control fluid places the piston 50 in the proximal position and the release of the pressure force by lowering the control fluid pressure allows the spring 54 to return the piston 50 to the distal position. The opening and closing of the valve 3 can thereby be controlled.

Like the peripheral chamber 28, the intermediate chamber 37 also forms a vent chamber. Preferably, the peripheral chamber 28 is fluidically connected to the intermediate chamber 37 by one or a plurality of conduits formed in the body 30, so that the chambers 28 and 37 together form the vent chamber. In the event of failure of one of the seals, or of the ring 81, pressurized fluid or control fluid can escape toward the chambers 28 and 37 through the failed seal to prevent the penetration into the rest of the valve 3.

The piston 50 and the diaphragm 80 may be considered in a grouped manner, as a piston-diaphragm assembly belonging to the valve 3. During the manufacture of the valve 3, the piston-diaphragm assembly is preferentially installed in the body 30 while, in the piston-diaphragm assembly, the ring 82 is already accommodated in the groove 58 of the stem 52 and while the needle 90 is already attached to the stem 52. The above involves inserting the piston 50 into the central conduit 33 and then attaching the ring 81 in the groove 40. The body 30 is then installed in the bore 20 of the base 2. Similarly, for maintenance, the entire piston-diaphragm assembly may be replaced by removing the worn piston-diaphragm assembly as a unit from the body 30 and then reassembling the repaired piston-diaphragm assembly, or a new piston-diaphragm assembly, as a unit in the body 30.

To manufacture the piston-diaphragm assembly, a manufacturing method is used which comprises several steps described hereinafter.

Initially, the stem 52, the needle 90 and the diaphragm 80 are provided in a configuration where said parts are separated from one another.

Figure 5:
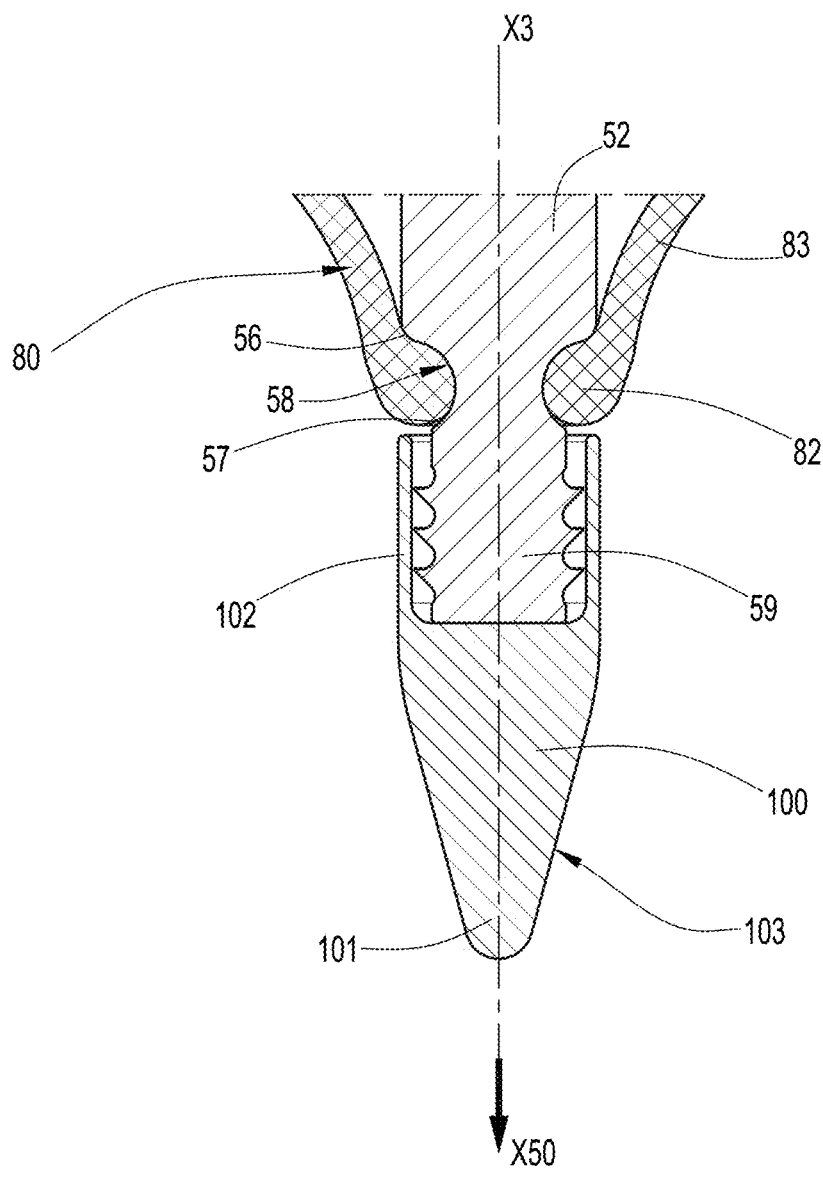
FIG. 5 is a view similar to the view of FIGS. 1, 2 and 4, showing a step in a method of manufacturing a piston-diaphragm assembly belonging to the valve.

Then, as shown in FIG. 5, the method advantageously comprises positioning a temporary cap 100 on the stem distal end 59. At this stage, the needle 90 is not yet attached to the stem 52 and the internal annular ring 82 of the diaphragm 80 is not yet fitted onto the stem 52.

The temporary cap 100 advantageously comprises a proximal base 102, by means of which the cap 100 is attached to the stem distal end 59. Preferably, the proximal base 102 comprises a bore open in the direction opposite to the direction X50 to accommodate the end 59 therein. The proximal base 102 thereby covers the end 59, preferably entirely, in particular by covering any claws provided, if appropriate, at the end 59. Preferably, the base 102 extends as far as the distal rim 57 of the groove 58, when the cap 100 is positioned. Externally, the base 102 preferably has a cylindrical shape with a circular base, centered on the axis X3.

The temporary cap 100 advantageously comprises a distal end 101 of tapered shape along the distal direction X50, centered on the axis X3, and an extreme tip of which is advantageously rounded. Preferably, the end 101 forms an external tapered surface 103, which herein is conical. The surface 103 is convergent along the distal direction X50. The end 101 converges along the direction X50. The end 101 continues the external shape of the base 102 so that, externally, the cap 100 is entirely tapered, e.g. with a cylindrical-conical general shape.

The method then comprises fitting the internal annular ring 82 onto the stem 52, while the needle 90 is still not attached onto the stem and while the cap 100 is in place on the stem 52. The internal annular ring 82 is fitted on via the distal end 59 until the internal annular ring 82 is accommodated in the piston groove 58 in order to attach the diaphragm 80 to the stem 52. Since the cap 100 is installed, the fitting on of the internal annular ring 82 onto the stem 52 is carried out by means of the temporary cap 100, with the internal annular ring 82 sliding along the external tapered surface 103 of the temporary cap, in the direction opposite to the direction X50. The use of the cap 100 facilitates the fitting on of the ring 82, in that the ring 82 can easily be traversed by the pointed end of the temporary cap 100, then be progressively elastically moved away as progressively as same moves along the external tapered surface 103, then finally elastically returns to a tighter shape once the cap 100 has been passed, in order to be accommodated in the groove 58. The cap 100 also advantageously makes it possible that the claws supported by the end 59 do not damage the ring 82.

The method then comprises a removal of the temporary cap 100, while the internal annular ring 82 is accommodated in the groove 58, and before attaching the needle 90 to the stem distal end 59.

The method then comprises, while the internal annular ring 82 is accommodated in the groove 58 and the temporary cap 100 has been removed, an attachment of the needle 90 to the stem distal end 59. For this purpose, the needle 90 is sleeved onto the stem 52, by force sleeving the proximal attachment interface 92 onto the stem end 59, in the direction opposite to the direction X50. The claws of the stem end 59, if provided, then prevent a withdrawal of the needle 90. The needle 90 is attached in such a way that the crown 93 surrounds the stem 52 by externally covering the internal annular ring 82, so that the base 94 is adjacent to the groove distal rim 57, and the diaphragm 80 is radially interposed between the groove proximal rim 56 and the crown rim 95, being in contact with the crown rim 95, as described hereinabove.

Any feature described hereinabove for one of the embodiments or one of the variants can be used for the other embodiments and variants described hereinabove, as far as is technically possible.

The invention claimed is:

1. A piston-diaphragm assembly for a valve, the assembly comprising:
   a piston that comprises:
      a stem, which extends parallel to a distal direction, the stem being intended to be received in a central conduit of a body of the valve, in a sliding manner relative to the body parallel to the distal direction, the stem comprising a piston groove surrounding the stem and being radially outwardly open, the piston groove comprising a groove proximal rim and a groove distal rim between which the piston groove is delimited, the groove distal rim being offset from the groove proximal rim in the distal direction; and a needle, which is fastened to a stem distal end, belonging to the stem, and which is configured to abut against a shut-off seat along the distal direction to shut off a pressurized fluid conduit; and
   a diaphragm that comprises:
      a peripheral annular ring for fastening the diaphragm to the body of the valve, the peripheral annular ring surrounding the piston;
      an internal annular ring, which surrounds the piston and is received in the piston groove to thereby attach the diaphragm to the piston; and
      an annular membrane, which connects the peripheral annular ring to the internal annular ring;
   wherein the needle comprises:
      a crown which surrounds the stem and externally covers the internal annular ring; and
      a crown rim which ends the crown in a direction opposite to the distal direction, the crown rim being arranged at the height of the groove proximal rim, the diaphragm being radially interposed between the groove proximal rim and the crown rim and being in contact with the crown rim.

2. The piston-diaphragm assembly according to claim 1, wherein the crown further comprises a base adjacent the groove distal rim.

3. The piston-diaphragm assembly according to claim 2, wherein the crown further comprises an internal conical surface which connects the base to the crown rim which converges along the distal direction, the crown being in slant abutment in the direction opposite to the distal direction against the diaphragm via the internal conical surface.

4. The piston-diaphragm assembly according to claim 2, wherein the crown further comprises an internal concave curved surface which connects the base to the crown rim which converges along the distal direction, the crown being in slant abutment in the direction opposite to the distal direction against the internal annular ring via the internal concave curved surface.

5. The piston-diaphragm assembly according to claim 2, wherein the crown further comprises an internal chamfer which converges along the distal direction and which is adjacent to the groove distal rim.

6. The piston-diaphragm assembly according to claim 1, wherein the needle further comprises a proximal attachment interface forming an internal conduit through which the needle is fastened to the stem, the crown extending from the proximal attachment interface, in the direction opposite to the distal direction.

7. The piston-diaphragm assembly according to claim 6, wherein the needle is fastened to the stem by fitting the stem distal end into the proximal attachment interface along the distal direction.

8. The piston-diaphragm assembly according to claim 1, wherein the groove proximal rim is radially wider than the groove distal rim.

9. The piston-diaphragm assembly according to claim 1, wherein the piston groove has a radial section in the form of a portion of a circle, from the groove distal rim to the groove proximal rim.

10. The valve comprising:
   the piston-diaphragm assembly according to claim 1; and
   the body, having a central conduit coaxial with a central axis and opening out at a body distal end belonging to the body;
   wherein:

the piston is slidable relative to the body along the central axis between a distal position and a proximal position, the distal direction of the piston being parallel to the central axis;

the stem is received in the central conduit, protruding from the central conduit from the body distal end when the piston is in the distal position;

the needle is arranged outside the central conduit, being offset in the distal direction from the body distal end, regardless of whether the piston is in the proximal position or in the distal position;

the peripheral annular ring attaches the diaphragm to the body distal end;

the diaphragm separates the central conduit from a pressurized fluid chamber delimited beyond the diaphragm in the distal direction, and is configured to be elastically deformed between:

an initial shape, when the piston is in the distal position and no overpressure occurs in the pressurized fluid chamber relative to the central conduit, and stretched shapes, under the effect of an overpressure occurring in the pressurized fluid chamber relative to the central conduit; and the crown rim is in contact with the diaphragm, whether the diaphragm is in the initial shape or in one of the stretched shapes and whether the piston is the distal position or in the proximal position.

11. A method for manufacturing the piston-diaphragm assembly according to claim 1, the method comprising:

fitting of the internal annular snap ring onto the stem, while the needle is not yet fastened onto the stem, the internal annular ring being fitted via the stem distal end and until the internal annular ring is received in the piston groove to attach the diaphragm to the stem; and while the internal annular ring is received in the piston groove, fastening the needle to the stem distal end so that:

the crown surrounds the stem by externally covering the internal annular ring; and the diaphragm is radially interposed between the groove proximal rim and the crown rim, by being in contact with the crown rim.

12. The method according to claim 11 further comprising:

the positioning of a temporary cap on the stem distal end, while the needle is not yet fastened to the stem and the internal annular ring is not yet fitted onto the stem, the temporary cap covering the stem distal end, the internal annular ring being fitted onto the stem via the temporary cap, with sliding of the internal annular ring along an outer tapered surface of the temporary cap, the outer tapered surface being convergent along the distal direction; and the removal of the temporary cap, while the internal annular ring is accommodated in the groove piston, and before the fastening of the needle to the stem distal end.

* * * * *